US006221327B1

(12) United States Patent
DeCourcy et al.

(10) Patent No.: US 6,221,327 B1
(45) Date of Patent: Apr. 24, 2001

(54) CATALYST SYSTEM USING FLOW-THROUGH RADIATION SHIELDING AND A PROCESS FOR PRODUCING HYDROGEN CYANIDE USING THE SAME

(75) Inventors: Michael Stanley DeCourcy, Houston; Michael Gene Woody, Deer Park; Karen Ann Shaw, League City, all of TX (US); Joy Lyndon Mendoza, Landsdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/270,410

(22) Filed: Mar. 16, 1999

Related U.S. Application Data
(60) Provisional application No. 60/085,744, filed on May 15, 1998.

(51) Int. Cl.$^7$ .................................................. C01C 3/02
(52) U.S. Cl. .................................................. 423/376
(58) Field of Search ........................... 423/376; 422/211, 422/177, 180, 184

(56) References Cited

U.S. PATENT DOCUMENTS

| | | |
|---|---|---|
| 1,938,838 | 11/1933 | Andrussow . |
| 2,803,522 | * 8/1957 | Inman ................................. 423/376 |
| 3,056,655 | * 10/1962 | Inman ................................. 423/376 |
| 3,104,945 | 9/1963 | Jenks et al. . |
| 3,215,495 | 11/1965 | Jenks et al. . |
| 3,228,892 | * 1/1966 | Cole et al. . |
| 3,397,154 | * 8/1968 | Talsma . |
| 3,545,939 | 12/1970 | Cox et al. . |
| 3,880,235 | 4/1975 | Berry et al. . |
| 4,118,199 | * 10/1978 | Völker et al. . |
| 4,128,622 | 12/1978 | Loos, II et al. . |
| 4,136,156 | 1/1979 | Weigert . |
| 4,469,666 | 9/1984 | Stephenson et al. . |
| 5,039,643 | 8/1991 | Hecht et al. . |
| 5,096,687 | 3/1992 | Agrawal . |
| 5,177,961 | * 1/1993 | Whittenberger ..................... 422/174 |
| 5,262,145 | 11/1993 | Agrawal et al. . |
| 5,271,906 | * 12/1993 | Yuuki et al. ......................... 422/177 |
| 6,113,864 | * 9/2000 | Kueper et al. ....................... 422/177 |

FOREIGN PATENT DOCUMENTS

| | | |
|---|---|---|
| 1009137 | 1/1963 | (GB) . |
| 1094771 | 1/1965 | (GB) . |
| 1089869 | 6/1966 | (GB) . |
| WO97/09273 | 3/1997 | (WO) . |

OTHER PUBLICATIONS

Copy of European Search Report dated Aug. 31, 1999.

* cited by examiner

*Primary Examiner*—Wayne Langel
(74) *Attorney, Agent, or Firm*—Alan Holler (57) ABSTRACT

This invention relates to an improved catalyst system utilizing flow through radiation shielding of the reaction zone and to processes for using the catalyst system for the production of hydrogen cyanide. The process has decreased methane usage while maintaining yield of cyanide.

7 Claims, 5 Drawing Sheets

CATALYST SYSTEM USING FLOW-THROUGH RADIATION SHIELDING AND A PROCESS FOR PRODUCING HYDROGEN CYANIDE USING THE SAME

This is a non-provisional application of prior pending provisional application Ser. No. 60/085,744, filed May 15, 1998.

This invention relates to an improved catalyst system and to processes for using the catalyst system. In particular, to a catalyst system utilized in high temperature reactions having flow-through radiation shielding as well as to a process for preparing hydrogen cyanide using the same.

The maintenance of system energy in a high temperature catalytic reaction is important. For instance, in the manufacture of hydrogen cyanide by the ammoxidation of methane a high reaction temperature is required to maintain the highly endothermic cyanide formation reaction. In the Andrussow method for preparing hydrogen cyanide (see U.S. Pat. No. 1,934,838), ammonia oxygen-containing gas such as air, and hydrocarbon gases such as methane are fed to a reaction system, at ambient or elevated temperature. The reactants are then reacted in the presence of a Pt-containing catalyst at temperatures of 1000° C. to 1400° C. to produce hydrogen cyanide.

In such high temperature catalytic reactions, a considerable amount of system energy may be lost as radiant energy. One mechanism for loss of radiant energy, in high temperature catalytic reactions, occurs when a metal containing catalyst material is utilized in the reaction. Such a catalyst material will glow as a result of the high temperatures of the reaction. Consequently, energy in the form of radiant energy is emitted from the glowing catalyst. Such radiant energy can escape from the reaction zone wherein it is lost to unproductive heating of upstream equipment, refractory, cooling jackets and the surrounding environment.

In the aforementioned Andrussow process for preparing hydrogen cyanide, the system energy demand is primarily met through combustion of a portion of the hydrocarbon/ammonia reactant feed gases. Accordingly, the net result of such loss of radiant energy is an increase in consumption of hydrocarbon/ammonia for combustion to maintain the system energy. Consequently, either additional hydrocarbon/ammonia feed gas is utilized or the yield of hydrogen cyanide product decreases because less reactants are available to the reaction because of combustion. As a result, there is an increase in manufacturing costs because an increased proportion of reactants are used to fulfill the reaction system's energy demands. Accordingly, there is a constant demand for means to decrease reactant combustion thereby improving hydrogen cyanide yield.

Pre-heating of reactant gases has been disclosed as a means of decreasing reactant combustion and improving hydrogen cyanide yield. In U.S. Pat. No. 3,104,945 a process for preparing hydrogen cyanide is disclosed where air, methane and ammonia are preheated and mixed before being reacted in the presence of a platinum group metal catalyst. A decrease in oxygen and methane usage and increased hydrogen cyanide yield on methane and ammonia is disclosed.

Prevention of heat loss in hydrogen cyanide production is disclosed in U.S. Pat. No. 3,215,495 using a combination of two refractory fiber blankets having a layer of refractory particles disposed between the two blankets. The fiber blanket combination is disposed directly on the catalyst and provides a reduction in heat loss from the system resulting in decreased reactant combustion.

The present inventors have now discovered a novel catalyst system which employs flow through radiation shielding and a process for preparing hydrogen cyanide using the same wherein the following advantages are provided:

(1) radiant-energy losses from the reaction zone are minimized thereby lowering the reactant feed proportion which must be combusted to maintain the endothermic hydrogen cyanide formation reaction;

(2) higher hydrocarbon/ammonia yields of hydrogen cyanide are realized as a direct result of the shift away from combustion of reactants;

(3) the total volumetric load per unit of product hydrogen cyanide is reduced thus increasing production capacity more economically than other methods such as oxygen enrichment;

(4) improved flow distribution into the reaction zone, providing more-uniform catalyst temperatures which lead to higher yields;

(5) mechanical protection of the catalyst from yield-reducing process contaminants, as with filtration;

(6) lower upstream equipment surface-temperatures, which retards pre-combustion of feed gases, helps to minimize the potential for reverse flame-front propagation and associated deflagrations, reduces equipment cooling requirements, and allows for simplified mechanical designs vs. high-temperature requirements;

(7) reduced reaction system heat capacitance, allowing for faster heating at start-up and quicker cooling at shut-down of the reaction system (improved cycle time), faster cool-down also retards formation of volatile $PtO_2$, which is one mechanism for catalyst loss;

(8) longer life of downstream waste heat recovery exchangers as a result of lower total heat load for the same HCN production rate;

(9) reduced mass flow of $CO_2$/CO combustion products in the exit gas results in reduced bicarbonate or carbonate formation in caustic absorbers used in formation of sodium cyanide; and (10) less $CO_2$ mass flow, when absorption based ammonia recovery systems are used, such as in U.S. Pat. Nos. 2,590,146; 3,104,945; 4,094,958; and 4,128,622; reduces formation of ammonium carbamate which can interfere with the stable operation of ammonia purification/distillation columns and is also highly corrosive to carbon steel thereby by forming ferrous/ferric compounds in the recycle ammonia stream which are damaging ammonia compression equipment and may also poison the catalyst.

In one aspect of the present invention, there is provided a process for preparing hydrogen cyanide, including the steps of: (A) feeding reactants including at least one hydrocarbon, at least one nitrogen containing gas and at least one oxygen containing gas into a reactor; (B) pre-heating the reactants by passing the reactants through an at least partially heated radiation shield, comprising one or more pieces of a flowthrough ceramic material, into a reaction zone, the radiation shield having been at least partially heated by absorbing at least a portion of radiant energy produced in the reaction zone; (C) reacting the reactants at a temperature of 800° C. to 1400° C. in the presence of a platinum group metal catalyst disposed within the reaction zone to produce hydrogen cyanide; (D) monitoring the temperature of the reaction zone; and (E) adjusting the oxygen content of the reactants to maintain the reaction temperature within a range of 800° C. to 1400° C.

In a second aspect of the present invention, there is provided a catalyst system for use in a high temperature chemical process, including: (A) a reaction zone having a catalyst disposed therein; (B) a radiation shield including one or more pieces of a flowthrough ceramic material disposed upstream of the reaction zone for (i) absorbing at least a portion of radiant energy produced in the reaction zone, and (ii) transferring heat formed from absorbing the radiant energy to reactants flowing therethrough into the reaction zone; and (C) one or more temperature sensing devices disposed within the reaction zone.

Throughout this specification and claims, unless otherwise indicated, references to percentages are by weight and all temperatures by degree centigrade.

It is also to be understood that for purposes of this specification and claims that the range and ratio limits, recited herein, are combinable. For example, if ranges of 1–20 and 5–15 are recited for a particular parameter, it is understood that ranges of 1-15 or 5-20 are also contemplated.

Throughout this specification and claims the term "flowthrough" is defined as the ability of a substance, such as a reactant, to pass not only around individual pieces, but also to move through individual pieces because of the porosity or high internal surface area of the pieces.

Figure 1:
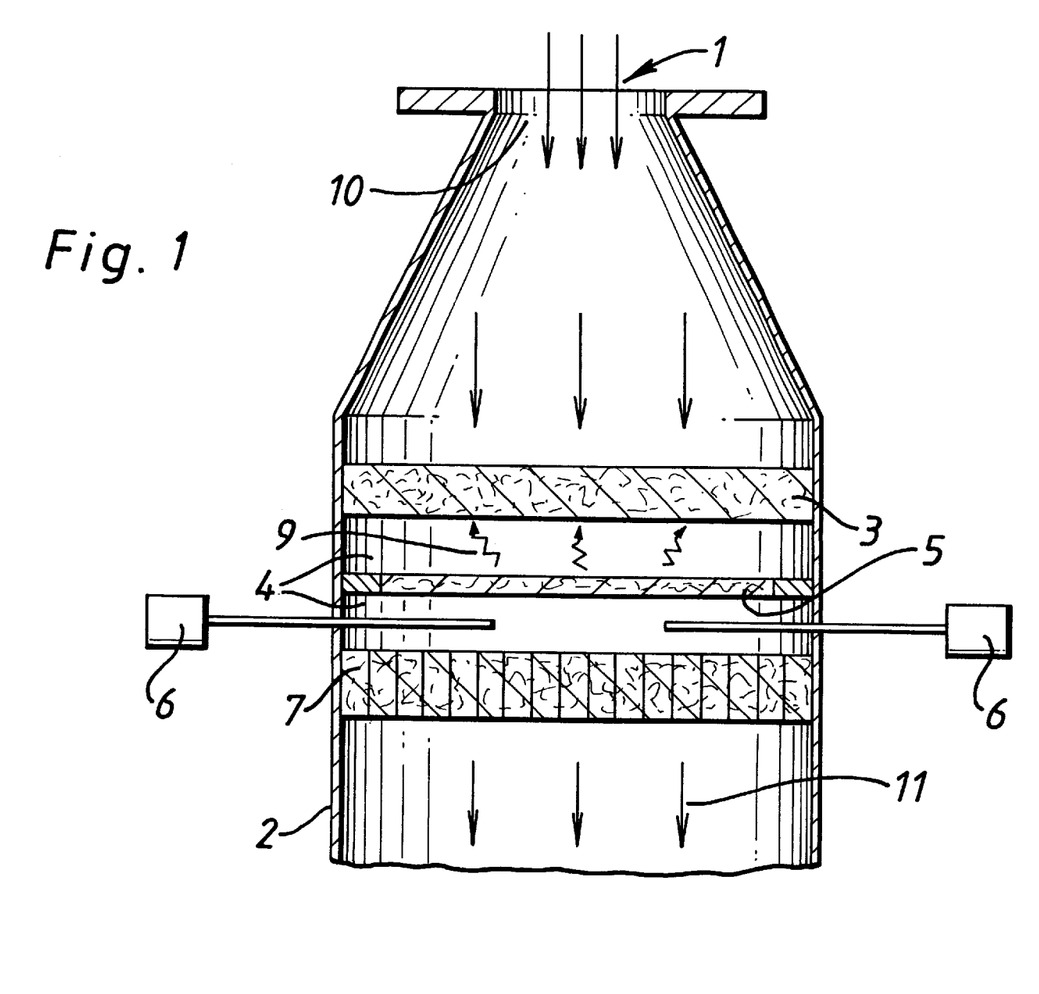
FIG. 1 depicts a partial view of a reactor containing one embodiment of a catalyst system of the present invention.

The process and catalyst system of the present invention will be described using the attached figures. FIG. 1 describes a first embodiment of the present invention. As indicated in FIG. 1, the catalyst system of the present invention for high temperature chemical reactions is contained within a reactor 2. The catalyst system includes a flow through radiation shield 3 disposed upstream of a reaction zone 4, a catalyst 5 disposed within the reaction zone 4, a catalyst support layer 7 disposed downstream of the catalyst 5, and temperature sensing devices 6 disposed between the catalyst 5 and the catalyst support 7 in the reaction zone 4. It is to be understood that in other embodiments the temperature sensing device(s) 6 may be disposed in the reaction zone 4 between the catalyst 5 and the flow through radiation shield 3 or after the catalyst support layer 7. It is to be also understood that the gaps shown in FIG. 1 and FIG. 4, i.e., the proximity, between the various components is expanded within the reactor for sake of clarity.

While the present invention is described in terms of the down-flow reactor designs illustrated in FIGS. 1 through 5, other alternative designs may be utilized. For instance, upflow reactors such as the reactor disclosed in WO 97/09273 may also benefit from the use of the catalyst system of the present invention. Specifically, by placing the shield downstream of the mixing zone and upstream of the catalyst lower pre-heating temperatures are required therefore minimizing detonation and other flammability hazards. The subject application relies on higher mixed stream velocity to prevent such hazards. The catalyst system of the present invention provides flexibility in velocity rates by contributing to hazard reduction by allowing lower mixed stream temperatures. Additionally, the catalyst system helps distribute reactant flow across the reaction zone.

In one embodiment of the catalyst system, the catalyst 5 and flow through catalyst support 7 are combined into a singular platinum containing metallic catalyst "pack". In a preferred embodiment, the flow through radiation shield 3 and the catalyst 5 are combined into a single ceramic foam component, with the downstream portion composed of a platinum containing, catalytically active material. In a more preferred embodiment, the catalyst 5 and the catalyst support layer 7 are combined into a single ceramic foam component, with the upstream portion composed of a platinum containing, catalytically-active material. In a most preferred embodiment, the flow through radiation shield 3, the catalyst 5, and the catalyst support layer 7 are combined into a single ceramic foam component, with the flow through radiation shield 3 being the upstream portion, the catalyst 5 the middle portion, and the catalyst support layer 7 the downstream portion.

Generally, reactants 1 are fed into the reactor 2 at inlet 10. The reactants 1 are then passed through radiation shield 3. Radiation shield 3 is at least partially heated by absorption of radiant energy 9 emanating from the heated reaction zone 4. As reactants 1 are flowed through radiation shield 3 the reactants 1 are pre-heated by the heated radiation shield 3. The pre-heated reactants 1 pass into the reaction zone 4 wherein they are contacted with the catalyst 5 to form hydrogen cyanide or alternatively are combusted in the reaction zone 4 to maintain system energy. The product gases 11 pass out of the reaction zone through the support layer 7 downstream for cooling and separation of hydrogen cyanide product.

Figure 2:
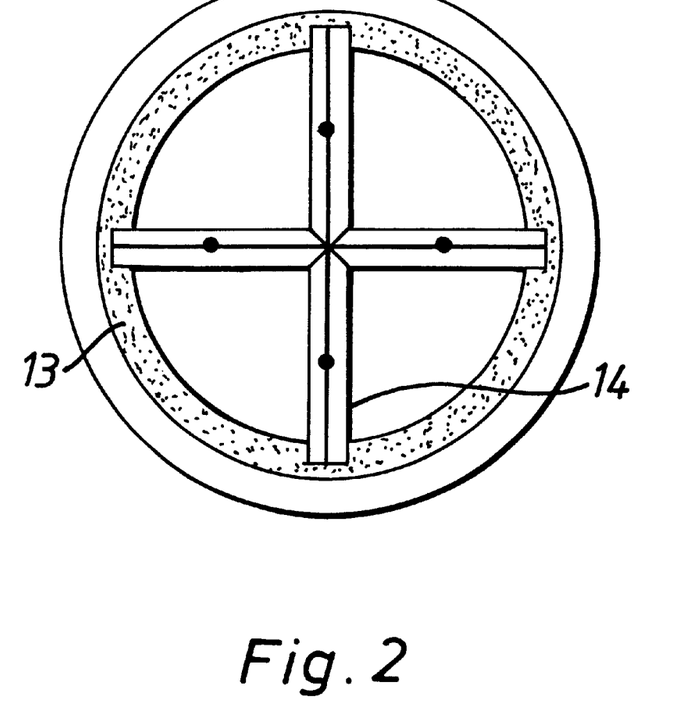
FIG. 2 depicts top and side views of another embodiment of a catalyst system of the present invention.
Figure 5:
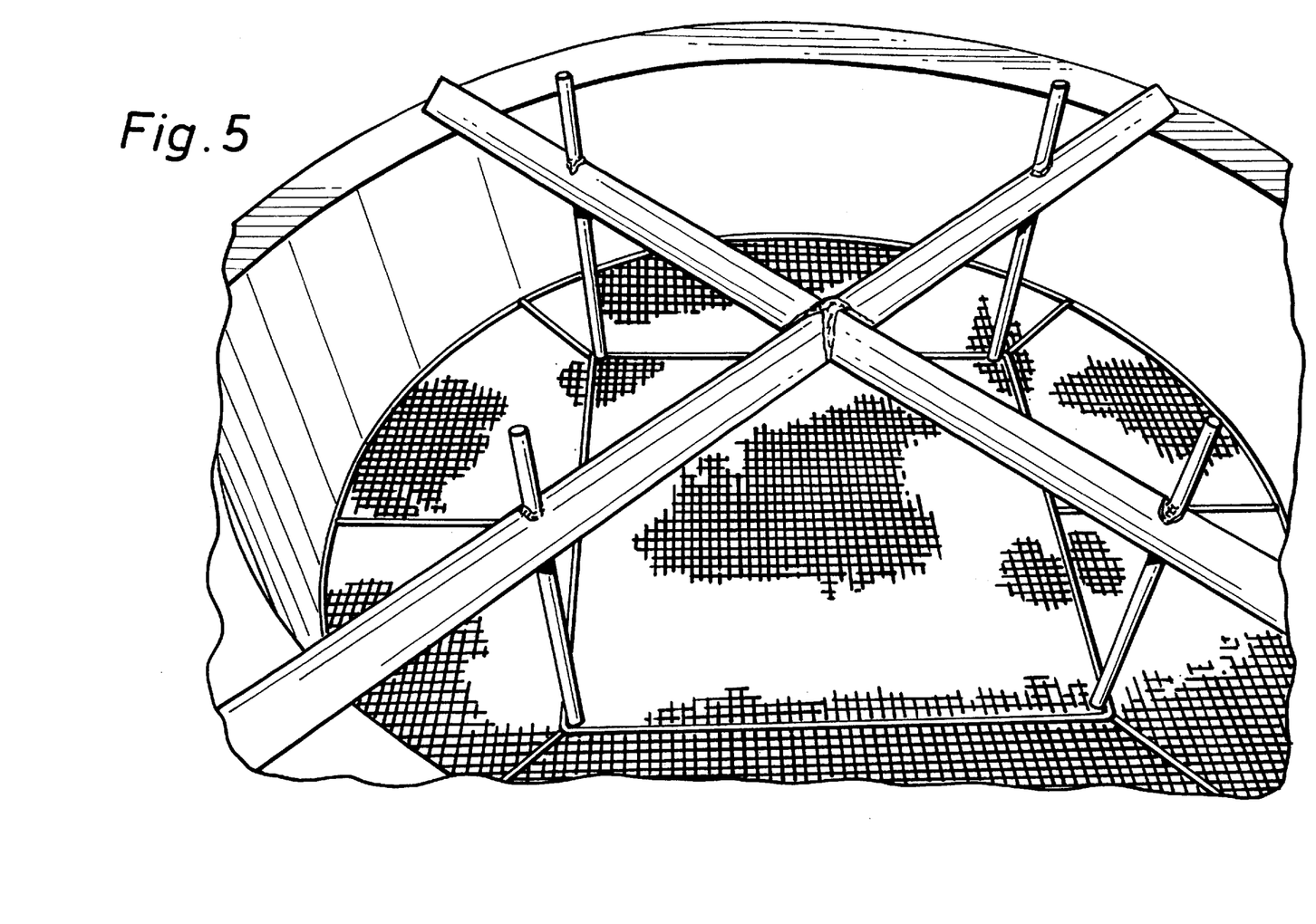
FIG. 5 depicts a restraining device utilized in one embodiment of the present invention.

The catalyst system may also include a restraining device 12 for securing the radiation shield 3 which allows individual shield piece(s), such as ceramic foam tiles, of the radiation shield to pivot upstream. During any shutdown of the system wherein feed gases are ceased to be fed to the reactor a pressure differential may occur which can cause the tiles to be lifted or displaced upstream or even damaged. One embodiment for the restraining device 12 is illustrated in FIG. 2. The restraining device 12 is placed above the one or more tiles of the radiation shield 3 and is attached to a castable refractory 13 at the wall by mounting hardware 14 so that a gap is created between the radiation shield 3 and the restraining device 12. Accordingly, in the instance wherein individual tiles of the shield 3 are lifted or displaced upstream, the tiles will pivot upstream and contact the restraining device 12 thus opening a gap to allow the pressure to equalize. Once the pressure differential is relieved the tile(s) will fall back into the correct position by the force of gravity. It will be recognize by those skilled in the art that the dimension of the gap will depend on the size of the tiles and be set to a distance which is suitable to allow the tile(s) to pivot arid return to the correct position. It will be recognized that although not required the benefits of the restraining device will be beneficial in any embodiment of the present invention and will be especially beneficial when two or more ceramic material tiles are utilized as the radiation shield 3. Any restraining device, suitable for use in a high temperature chemical reactor and of a composition, which does not cause catalyst contamination and poisoning may be used. In a preferred embodiment, the restraining device 12 is a 300 series stainless steel restraining screen as depicted in FIG. 5.

As recited above, the process for preparing hydrogen cyanide includes feeding reactants 1 into a reactor 2. The reactants include at least one hydrocarbon, at least one nitrogen containing gas, and at least one oxygen containing gas. It is to be understood that the oxygen containing gas may be the same as the nitrogen containing gas or the hydrocarbon.

The at least one hydrocarbon may be an aliphatic or substituted aliphatic, cycloaliphatic or substituted cycloaliphatic, or aromatic or substituted aromatic hydrocarbon or a mixture thereof. Suitable examples include, without limitation, methane ($CH_4$), ethylene ($C_2H_4$), ethane ($C_2H_6$), propylene ($C_2H_6$), propane ($C_3H_8$), butane ($C_4H_{10}$), methanol ($CH_3OH$), toluene, naphtha, and methyl formate. In a preferred embodiment, the at least one hydrocarbon is methane or a mixture of one or more hydrocarbons containing methane. The at least one nitrogen containing gas includes, without limitation, ammonia or formamide. In a preferred embodiment, the at least one nitrogen containing gas is ammonia or mixtures of ammonia with one or more nitrogen containing gasses. The at least one oxygen containing gas may be any material containing an amount of oxygen suitable to maintaining combustion to provide heat for endothermic hydrogen cyanide formation. Suitable examples include, without limitation, air, oxygen-enriched air, pure oxygen gas, carbon monoxide (CO), carbon dioxide ($CO_2$), or mixtures thereof or oxygen containing compounds which upon decomposition would provide oxygen. Suitable examples include peroxides, ketones, ethers, and the like.

The feed gases may be filtered and/or pre-heated prior to being flowed through the radiation shield into the reaction zone. Generally, the feed gases, with or without preheating, are mixed and then supplied to the reactor at a temperature from ambient temperature up to the reaction temperature. When pre-heating and/or oxygen enrichment is used and as the pre-heating temperature and/or oxygen concentration increases, the occurrence of flashback and/or detonation is more likely. Use of the catalyst system of the present invention allows use of lower pre-heating temperatures and/or modified oxygen content because the feed gasses are pre-heated by the radiation shield 3.

When fed into the reactor 2 the reactants 1 are preheated by passing the reactants 1 through an at least partially heated radiation shield 3 and into a reaction zone 4. The amount of preheating will depend on whether the feed gasses were preheated prior to being fed to the reactor 2. The radiation shield 3 is characterized by an ability to readily absorb radiant energy lost from the reaction zone, to allow feed gases to pass through, and to conduct the absorbed energy from itself into the feed gases such that they are effectively pre-heated as they pass through the shield. While the typical application of insulating materials is to retard energy loss due to the mechanisms of conduction and convection, the majority of the (previously unrecovered) energy losses in the hydrogen cyanide system are due to the mechanism of thermal radiation. In the prior art, without the radiation shield, radiant energy would leave the reaction zone and would be lost to unproductive heating of upstream equipment, refractory, cooling jackets, and the surrounding environment. Through the absorption-and-transfer nature of the radiation shield of the present invention, this radiant energy is prevented from escaping and system energy demand is reduced.

Generally, the radiation shield 3 may be any material which is capable of the functions described above. In one embodiment, the radiation shield is a flowthrough ceramic material. Preferably the flowthrough ceramic material has a high internal surface area. Suitable examples of the ceramic material include, without limitation, porous ceramics, ceramic foams, and ceramic composites.

Materials of construction may include, without limitation, one or more of the following: silicon dioxide (silica—$SiO_2$), silicon carbide (SiC), silicon nitride ($Si_3N_4$), silicon boride, silicon boronitride, aluminum oxide (alumina—$Al_2O_3$), aluminosilicate (mullite—$3\ Al_2O_3$—$2\ SiO_2$), aluminoborosilicate, carbon-fiber, refractory fiber, zirconium oxide (ZrO2), yittrium oxide (Y203), calcium oxide (CaO), magnesium oxide (MgO), and Cordite (MgO—$Al_2O_3$—$SiO_2$). In a preferred embodiment, the ceramic material is a ceramic foam material formed from at least one of carbides, nitrides, boronitrides, silicates, borosilicates, and oxides of aluminum, calcium, magnesium, silicon, zirconium, yittrium, mixtures thereof and composites thereof. Suitable ceramic materials are commercially available from Porvair Advanced Materials, Inc. of Hendersonville, N.C., as Ceramic Foam and GPM Porous Ceramic.

The radiation shield 3 is generally in the form of one or more pieces of flowthrough ceramic material. The piece(s) may take the form of any suitable shape adaptable for use in a particular reactor. Preferably, the radiation shield is in the form of one or more flowthrough ceramic tiles. Multiple tiles are generally preferred because they allow movement to accommodate thermal expansion thus avoiding fractures.

It is to be understood that the radiation shield of the catalyst system of the present invention may be formed of two or more layers of the radiation shielding described herein. For instance, in some applications wherein there is no concern regarding a pressure drop across the radiation shield, multiple layers or a thicker shield maybe utilized, to generate such a pressure drop, for purposes of further improving flow distribution through the system.

Furthermore, in an alternative embodiment, the radiation shield of the catalyst system of the present invention may be combined with one or more conventional insulating materials suitable for use in a high temperature chemical reaction. Suitable examples of conventional insulators include, without limitation, ceramic or refractory particles, ceramic or refractory fiber, or ceramic or refractory blanket such as Fiberfrax®—Durablanket manufactured by Unifrax Corporation of Niagara Falls, N.Y., and Altra® Refractory Blanket from Rath Performance Fibers, Inc., of Wilmington, Del.

As recited above, the ceramic foam material is generally in the form of one or more ceramic foam tiles, preferably two or more ceramic foam tiles. Preferably, the ceramic material has a high internal surface area. In one embodiment, the ceramic material has from 5 to 1000, preferably 5 to 750, more preferably 10 to 650 pores per inch. In another embodiment, the one or more ceramic foam tiles have from 5 to 250, preferably 5 to 200, more preferably 10 to 100 pores per inch. In an alternative embodiment, the one or more ceramic foam tiles have from 200 to 1000, preferably 300 to 800, more preferably 400 to 700 pores per inch.

Figure 3:
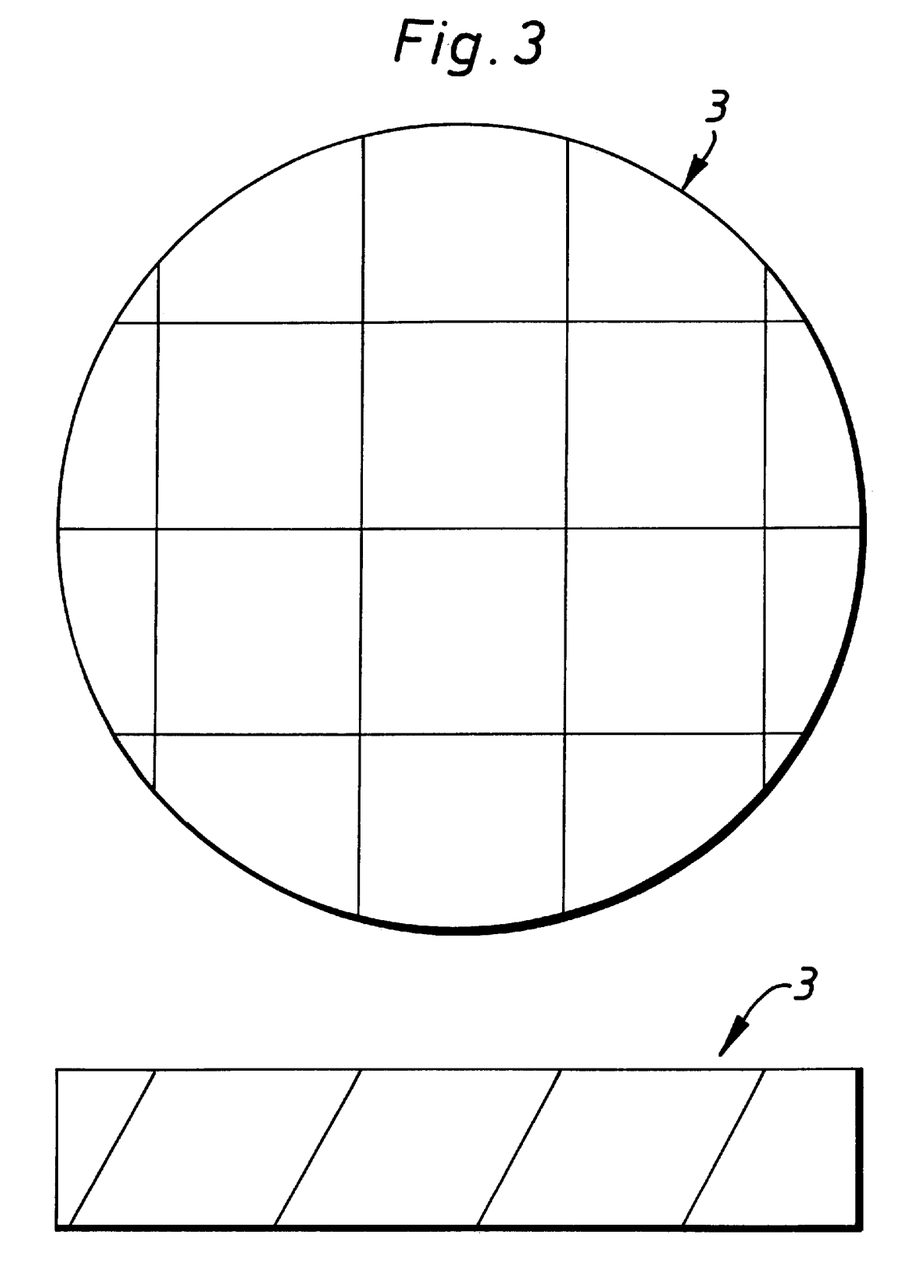
FIG. 3 depicts top and side views of another embodiment of the present invention of a radiation shield having one or more ceramic tiles having beveled edges.

In one embodiment, the tiles are at least partially fitted to one another so as to prevent gaps forming between adjacent tiles during use. Preferably, although not required, at least one edge of the one or more tiles is beveled, the beveled edges being cut so that beveled edges of adjacent tiles overlap. This is depicted in FIGS. 2 and 3. The degree of beveling will be designed according to the characteristics of a particular shield composition and system design requirements, such design being within the purview of those skilled in the art. Accordingly, the at least one beveled edge is matched to a corresponding beveled edge so that the corresponding beveled edges overlap over one another when the radiation shield 3 is assembled. The overlap of the beveled edges serves to insure that even if there is shifting of a ceramic tile during operation of the reactor the catalyst will still be shielded by a portion of the shield. That is, if the tiles are cut at a 90 degree angle and assembled face to face any separation of the tiles will expose a portion of the catalyst and allow radiant energy from that portion to escape upstream whereas the beveled edged tile will allow coverage of the catalyst even with shifting of the tiles. Such shifting of tiles is of even more concern when three dimensional catalyst geometries, for instance corrugated gauzes, are utilized because of the increased incidence of tile shifting when such gauzes are used. Furthermore, without the beveled edges there will be a less uniform flow of reactants to the reaction zone 4 leading to uneven yield over the catalyst surface. This uneven yield over the catalyst surface results in a lower net hydrogen cyanide product yield. Finally, when used in an embodiment containing a restraining device the beveled edges facilitate restrained pivoting of individual pieces during pressure release as described above.

Once in the reaction zone 4 the reactants are reacted in the presence of a platinum group catalyst 5 disposed within the reaction zone 4 to produce hydrogen cyanide. Generally, the platinum group catalyst may be in any form suitable for the production of hydrogen cyanide including, without limitation, platinum group containing sieves, meshes, or gauzes in any of a variety of geometries known in the art and specialty catalysts made by incorporating platinum group metal coatings on a variety of inert substrates including, for instance ceramic substrates. Generally, corrugated gauzes are preferred because they provide more surface area which leads to enhanced residence time and better mass transfer thereby improving reaction yields. Also, such gauzes have greater durability over repeated thermal cycles.

Furthermore, a platinum group metal granular catalyst may be utilized alone or in combination with a catalyst gauze. Such a granular catalyst may be in the form of pellets, spheres, chips, turnings, or in the form of a platinum group metal coating on an inert particle substrate such as beryl, alumina, sillimanate and the like. Suitable catalysts are described in, for instance, U.S. pat. No. 5,356,603; and are available from Johnson-Matthey, Inc. of Valley Forge, Penn.; PGP Industries, Inc., of Santa Fe Springs, Calif.; Engelhard, Inc., of Iselin, N.J.

As recited above, the catalyst is a platinum group metal catalyst. Accordingly, the platinum group metal catalysts is prepared from platinum, rhodium, iridium, palladium, osmium, or ruthenium or a mixture or alloy of two or more metals thereof Alternatively, the catalyst may be a mixture of a platinum group catalyst as described above and at least one other material including, but not limited to, cerium, cobalt, manganese, magnesium, and ceramic materials. Generally, the catalyst is an alloy of two or more platinum group metals containing 50 up to 100, preferably 75 up to 100, more preferably 85 up to 100 percent platinum. The preferred alloy is a platinum-rhodium alloy having 50 up to 100, preferably 75 up to 100, more preferably 85 up to 100 percent platinum, and 0.001 up to 50, preferably 0.1 up to 25, more preferably 1 up to 15 percent rhodium.

The catalyst is generally supported on at least one flow through catalyst support 7 which may include one or more layers of material such as metallic support screen(s), pre-cast ceramic or refractory, cast-in-place refractory, ceramic foam, ceramic packing, or anyone of the flow-through materials described as being useful for the radiation shield.

Generally, the reactants are reacted at a temperature of 800° C. to 1400° C., preferably 900° C. to 1350° C., more preferably 1000° C. to 1300° C.

Once the reaction has been initiated and the reaction temperature achieved, monitoring of the temperature of the reaction zone 4 is performed. Use of the catalyst system having a radiation shield as described herein results in a process for preparing hydrogen cyanide which is much more sensitive to changes in feed composition than a process using prior art catalyst systems. Accordingly, without continuous monitoring of reaction zone temperature severe, irreversible catalyst damage may result. As a result reliable temperature measurement is required to maintain the reaction temperature at appropriate values.

Generally, the temperature sensing or monitoring device 6 is any known device which is configured to survive the high temperatures and chemical compositions existing within the reaction zone. Suitable devices include, without limitation, thermocouples, resistive thermal devices (RTD's), or infra-red temperature measuring devices. Preferred temperature sensing or monitoring devices are those having sheathing, coatings, or the like which provide protection from the high temperature and chemical environment of the HCN reaction. Suitable temperature devices are available, for instance, from Gayesco, Inc. of Pasadena, Tex.

Finally, in response to the temperature measurement, the ratio of oxygen to reactants is adjusted to maintain the temperature at a range of 800° C. to 1400° C., preferably 900° C. to 1350° C., more preferably 1000° C. to 1300° C. That is, since the amount of oxygen present in the reaction zone 4 limits the amount of reactant combustion, the temperature in the reaction zone 4 can be controlled by adjusting the oxygen level. Furthermore, temperature can also be controlled by pre-heating of the reactants with or without oxygen adjustment.

The process of making hydrogen cyanide of the present invention may further include the step of measuring the composition of feed gases entering the reaction zone and the composition of the product gases. Such composition measurement allows adjustment of feed composition, e.g., the $NH_3$ to $CH_4$ reactant ratio, to maximize yield. Suitable real-time measuring devices are known in the art and include, without limitation, gas chromatography, mass spectrometry, gas chromatography-mass spectrometry, Fourier transform infra-red analysis (FTIR) and the like as well other on-line analytical techniques. In an alternative embodiment, composition analysis may be done by sampling with subsequent wet laboratory methods and instrumental laboratory methods known in the art. Alternatively, given suitable composition versus temperature data it is believed that a suitable model may be constructed whereby temperature could be inferred from the on-line composition measurements described above.

The process may be carried out at any pressure, that is at atmospheric, sub-atmospheric, or superatmospheric pressure. When practicing the process for preparing hydrogen cyanide of the present invention conventional gas mixtures, reaction conditions, reactors, etc., known in the art are utilized and are not described in detail herein.

Although the process for preparing hydrogen cyanide and the catalyst system used therein has been described in terms of the Andrussow reaction for preparing hydrogen cyanide, it is also contemplated that the catalyst system of the present invention may be used in other high temperature chemical processes. For instance, the catalyst system may also be beneficially employed to control radiant energy losses in the flame zone of combustion-based equipment such as heaters, direct-fired boilers, flares, furnaces, and thermal oxidizers—thereby providing a fuel savings. In these applications, the captured energy would be used to provide preheating of entering combustion air or fuels being delivered to the flame front. Additional applications include electrical or induction heated processes such as described in patent publication WO 95/21126 or the Shawinagan (Fluohmic) process. A special case of this application would be in "BMA" type, i.e., Degussa, processes for hydrogen cyanide production, where heat for the reaction is provided via (external) direct-firing of the ceramic reaction tubes.

The following Examples are provided as an illustration of the present invention.

EXAMPLE 1

Figure 4:
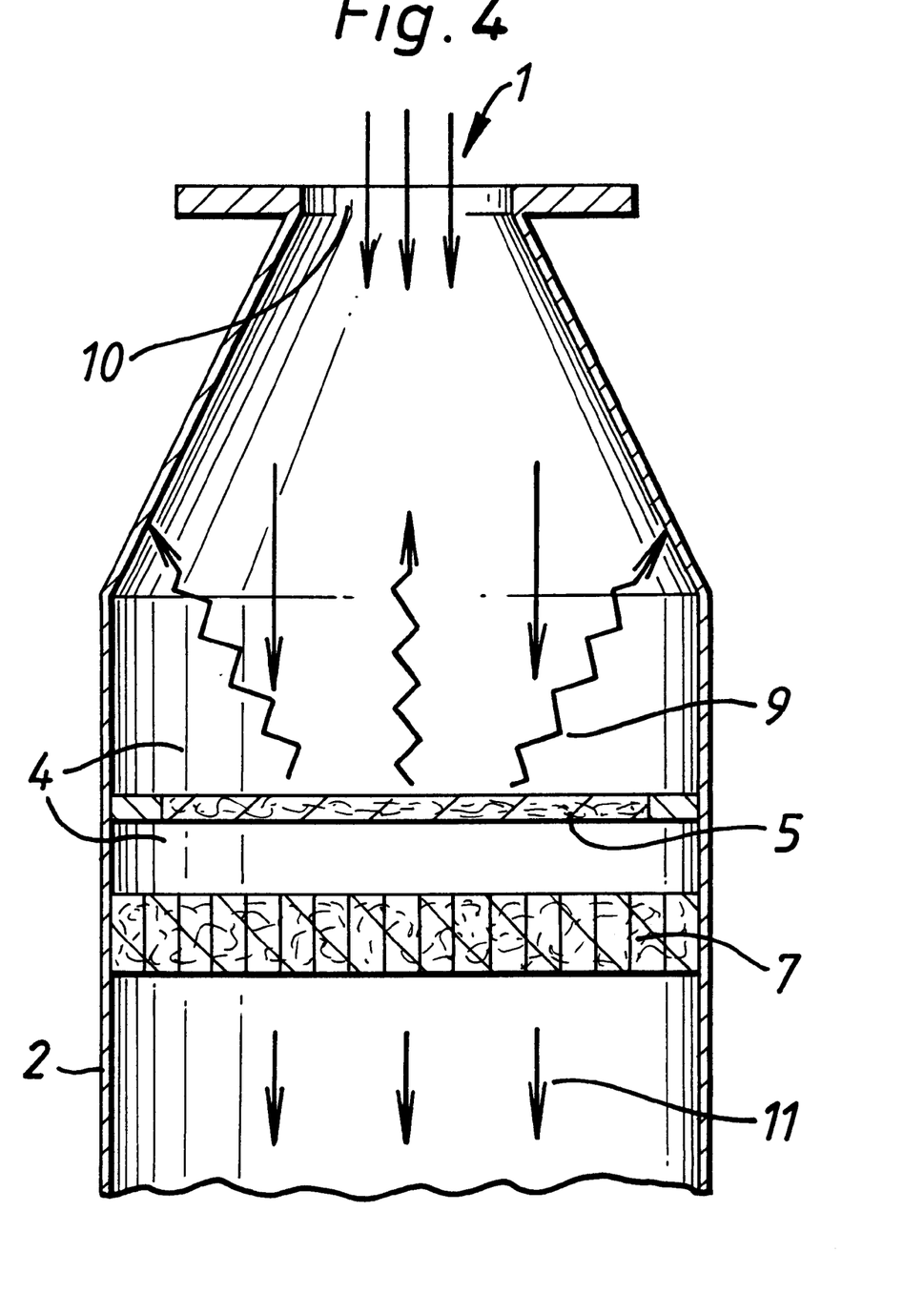
FIG. 4 depicts a partial view of a reactor having a conventional catalyst system.

Ammonia, methane and air reactants in an initial mixing ratio of 1:0.9:9 were fed to a conventional reactor without a radiation shield as depicted in FIG. 4. Ammonia was fed at an initial rate of 4500 pounds/hour with the other reactants fed at initial rates which maintain the initial mixing ratio. The reactants were introduced into a reaction zone having a platinum-rhodium (90:10) corrugated gauze catalyst purchased from Johnson-Matthey, Inc. of West Chester, Pa., and a hydrogen cyanide formation reaction was carried out at an initial temperature of 1150° C. for 850 hours. The feed ratios were adjusted during the run to maintain a constant yield of hydrogen cyanide. The product gases containing hydrogen cyanide were cooled to 300° C. and hydrogen cyanide was isolated from the product gases. The feed ratio of methane to ammonia for the 850 hour run was found to be in the range from 1.00:1.00 to 0.95:1.00 at an average hourly yield of hydrogen cyanide of 63.23% and at a constant target temperature of 1150° C.

EXAMPLE 2

Ammonia, methane and air reactants in an initial mixing ratio of 1:0.9:9 were fed to a reactor embodying the catalyst system of the present invention as depicted in FIG. 1. Ammonia was fed at an initial rate of 4500 pounds/hour with the other reactants were fed at initial rates which maintain the initial mixing ratio. The reactants were introduced into a reaction zone as depicted in FIGS. 1 and 2 having a platinum-rhodium (90:10) corrugated gauze catalyst purchased from Johnson-Matthey, Inc. of West Chester, Pa., a radiation shield of alumina foam tiles fitted together having 20 pores per inch with beveled edges purchased from Porvair Advanced Materials, Inc., of Hendersonville, N.C. and high temperature and chemical resistant thermocouples purchased from Gayesco Company of Pasadena, Tex. A hydrogen cyanide formation reaction was carried out at a target temperature of 1150° C. for 1000 hours. The methane/ammonia feed ratios were adjusted during the run to maintain a constant yield of hydrogen cyanide and the air feed was adjusted according to the temperature measurement to provide a suitable amount of oxygen to maintain the temperature at the target 1150° C. The product gases containing hydrogen cyanide were cooled to 300° C. and hydrogen cyanide isolated from the product gases. The feed ratio for the 1000 hour run of methane to ammonia was found to be 0.88:1.00 to 0.85:1.00 at an average hourly hydrogen cyanide yield of 64.08% and at a constant temperature of 1150° C.

A comparison of Example 1, which employs a process for preparing hydrogen cyanide which uses a conventional reactor having a catalyst system wherein the catalyst is not shielded, versus Example 2, which employs the process for preparing hydrogen cyanide of the present invention which uses a reactor having a catalyst system having flow through radiation shielding according to the present invention, shows a 10 to 12 percent reduction in methane usage. This reduction in methane usage is achieved without sacrificing hydrogen cyanide yield which is constant (approximately 63 to 64% in both examples). Such savings in methane usage is attributable to the catalyst system of the present invention which has a radiation shield which absorbs radiant energy produced in the reaction zone and transfers the energy in the form of heat to reactants passing therethrough thus preheating the reactants. Consequently, radiant energy previously unrecovered in the prior art is recovered and utilized to reduce reactant combustion thus lowering the manufacturing cost of the process. Furthermore, as a result of the methane usage being lower, the mass flow through the system is lower. Consequently, since the amount of $CO/CO_2$ is unchanged, the mass flow of $CO/CO_2$ is lower in the exit gas, therefore leading to reduced bicarbonate, carbonate and carbamate production and the problems described above which are associated therewith.

We claim:

1. A process for preparing hydrogen cyanide, comprising the steps of:

(A) feeding reactants comprising at least one hydrocarbon, at least one nitrogen containing gas and at least one oxygen containing gas into a reactor;

(B) pre-heating the reactants by passing the reactants through a radiation shield, comprising one or more pieces of a flowthrough ceramic material, into a reaction zone, the radiation shield not being catalytically active, the radiation shield having been at least partially heated by absorbing at least a portion of radiant energy produced in the reaction zone;

(C) reacting the reactants at a temperature of 800° C. to 1400° C. in the presence of a platinum group metal disposed within the reaction zone to produce hydrogen cyanide;

(D) monitoring the temperature of the reaction zone; and (E) adjusting the oxygen content of the reactants to maintain the reaction temperature within a range of 800° C. to 1400° C.

2. The process of claim 1, further comprising adjusting the at least one nitrogen containing gas to at least one hydrocarbon reactant ratio to maximize product yield.

3. The process of claim 1, wherein the one or more pieces of flowthrough ceramic material are one or more ceramic foam tiles having from 5 to 1000 pores per inch.

4. The process of claim 3, wherein the one or more pieces of ceramic foam tiles are fitted to one another at least on one side.

5. The process of claim 3, wherein the one or more ceramic foam tiles have a beveled edge on at least one side.

6. The process of claim 1, wherein the at least one nitrogen containing gas is $NH_3$ and the at least one hydrocarbon is $CH_4$.

7. The process of claim 2, wherein the at least one nitrogen containing gas is $NH_3$ and the at least one hydrocarbon is $CH_4$.

* * * * *